Aug. 8, 1933.  M. BERKOWITZ  1,921,449
MOTION PICTURE PROJECTING MACHINE
Filed Aug. 5, 1930
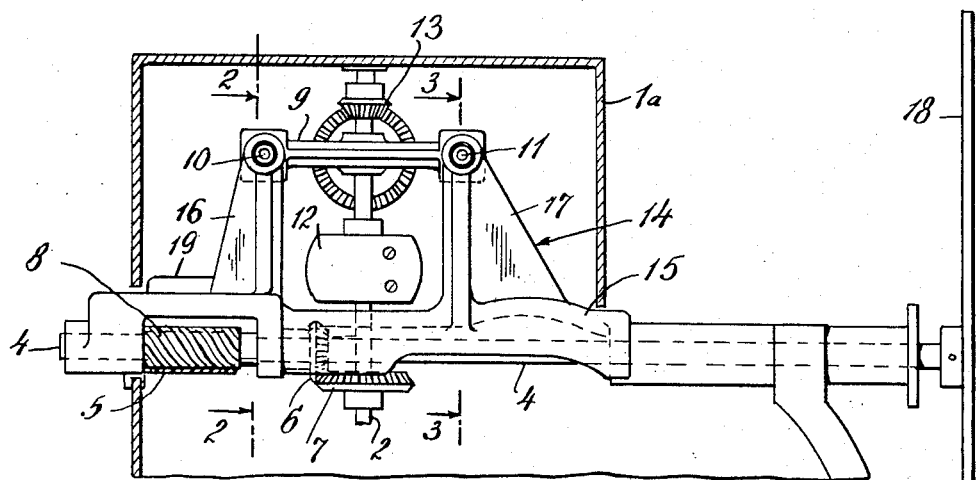
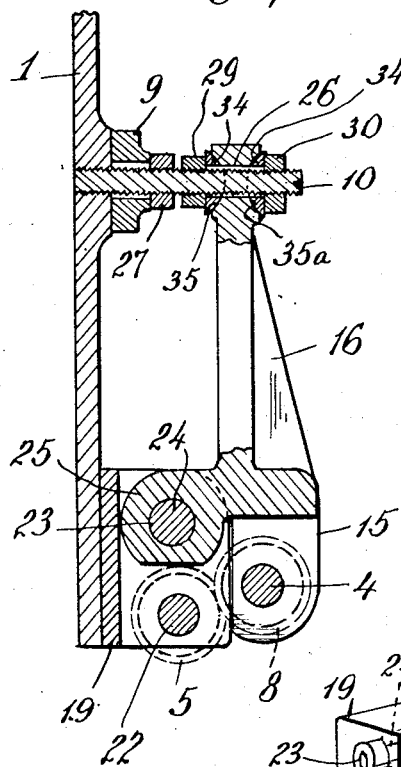
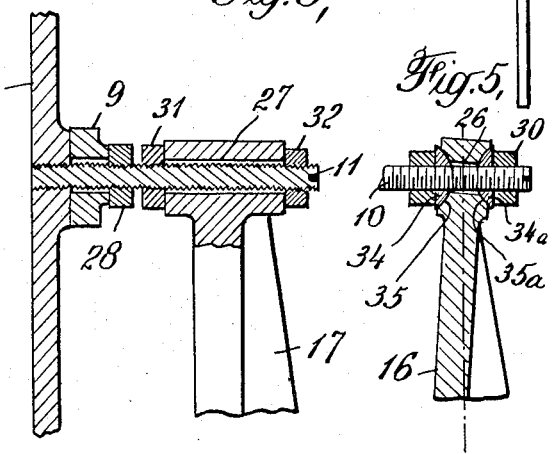
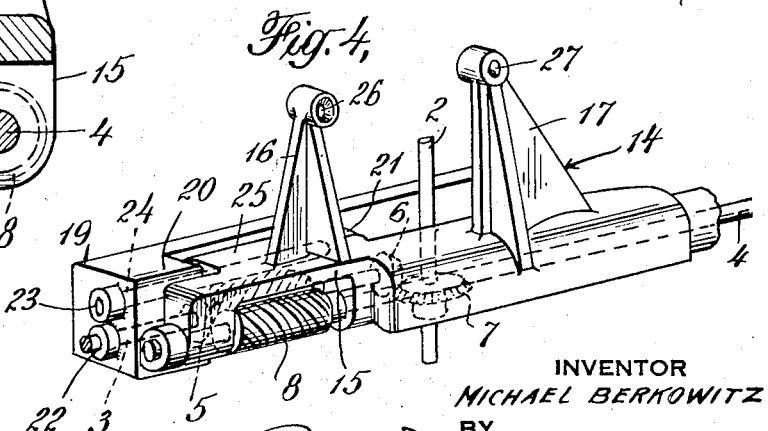
INVENTOR
MICHAEL BERKOWITZ
BY
Pennie, Davis, Marvin & Edmonds
ATTORNEYS Patented Aug. 8, 1933

1,921,449

UNITED STATES PATENT OFFICE 1,921,449

MOTION PICTURE PROJECTING MACHINE

Michael Berkowitz, New York, N. Y., assignor to United Research Corporation, Long Island City, N. Y., a Corporation of Delaware Application August 5, 1930. Serial No. 473,177

5 Claims. (Cl. 88—17)

This invention relates to improvements in motion picture projecting machines and has for its object the provision of an improved mounting for the shutter shaft.

Projecting machines of the form which employ a rotary disc, known as a shutter, for intermittently intercepting a beam of light emanating from the lamphouse during the interval the film is changing its position before the projecting lens—and this includes substantially all of commercial projectors in use at the present time—may be classified broadly according to the position occupied by the shutter. In one common class of projecting machines the shutter is located forwardly of the projector housing and intercepts the light beam after it has passed thru the housing and issued from the lens. In another well-known class of projecting machines this arrangement is modified by locating the shutter to the rear of the housing for intercepting the light beam after it issues from the lamphouse but before it enters the projector housing, this second construction permitting the revolving shutter to be suitably modified for operation as a fan to blow the heated atmosphere surrounding the lamphouse away from the projector housing preventing overheating of the celluloid film.

As is usual in the first class of machines the shutter is mounted upon the exteriorly projecting end of a shaft traversing a portion of the length of the housing, this shaft being driven from a countershaft located below the shutter shaft thru intermeshing spiral gears carried upon the two shafts; the countershaft is in turn geared to and driven by a vertical drive shaft located at a position intermediate the length of the housing. The shutter shaft and countershaft are in this class of projectors journaled in a common bearing block supported upon the frame within the housing.

In the construction of projectors of the second class an independent bearing for the shutter shaft is customarily employed in order to support the shaft in such position that it will clear the normally obstructing mechanism contained within the projector housing and permit its extension to the rear of the housing. Because of this independent mounting of the shutter shaft difficulty is experienced during assembly of the projector in attaining the correct adjustment of the shutter shaft relative to the countershaft so that the intermeshing spiral gears carried upon these shafts will be located in exact registry and provided with the proper amount of clearance therebetween. Furthermore such adjustment when once made must be maintained over relatively long periods of time within fairly precise limits to insure the correct synchronization of the shutter with the film feeding mechanism and in the past frequent annoyance has been occasioned by reason of the screws which clamp the bearing in position backing off along their studs and permitting the shutter shaft to spring away from the countershaft sufficiently far to impair the operation of the machine.

It is the object of the present invention to overcome the above objections by providing a mounting for the shutter shaft which facilitates the initial location of the shutter-shaft in accurate relation to the countershaft and by providing a more effective means for retaining the shuttershaft in its original position of adjustment.

The invention will be better understood from the following detail description of one exemplification, reference being had to the accompanying drawing in which:

Figure 1 is a side elevation of a portion of the center frame assembly showing a shutter shaft bracket mounted in position according to the invention;

Figure 2 is a cross-section on the plane 2—2 of Fig. 1 showing the means for supporting one arm of the bracket;

Figure 3 is a cross-section on the plane 3—3 of Fig. 1 showing the means for supporting the other arm of the bracket;

Figure 4 is a perspective of the shutter shaft bracket; and

Figure 5 is a detail of the upper end of the bracket arm showing in Fig. 1 and illustrating the improved means for firmly clamping the arm in a non-perpendicular position of adjustment relative to the axis of its supporting stud.

In accordance with one well-known form of projecting machine a center frame consisting of a vertically extending wall 1 provides a rigid support upon which is carried the various elements of the projector mechanism. The mechanism to which the present invention relates is customarily enclosed within a housing 1a and in general comprises a vertical drive shaft 2, a countershaft 3, and a shutter shaft 4. Upon the countershaft 3 is a spiral gear 5 (known as a "broached-hole gear" descriptive of its form of sliding mounting upon countershaft 3), and a bevel pinion 6, the latter being in engagement with a complementary bevel gear 7 carried on the vertical shaft 2. The spiral gear 5 of countershaft 3 meshes with a corresponding spiral gear 8 fastened upon the shutter shaft 4.

The vertical drive shaft 2 is journaled at its upper end within a bracket 9 clamped upon two threaded studs 10 and 11 which project laterally from the wall 1. This vertical shaft is rotated by the usual means, not shown, and is provided with a governor weight 12 for controlling its speed of rotation and also with a bevel gear 13 for driving a film feeding sprocket mounted upon the opposite side of wall 1. Motion is transmitted to shutter shaft 4 thru the train of gears 7, 6, 5 and 8. For supporting the shutter shaft 4 a bracket 14 is provided. This bracket comprises an elongated bearing member 15 extending parallel to the wall 1 and two integrally-cast arms 16 and 17 projecting upwardly therefrom; and within this bearing member is journaled the shutter shaft 4 having a rotary shutter disc 18 fastened upon its end exteriorly of the housing.

Rigidly fixed upon wall 1 is a block 19. This block is formed with two spaced horizontally-projecting arms 20 and 21. These arms are each provided with two transverse parallel bores 22 and 23 extending in axial alignment in the opposed arms. Journaled within the bore 22 and spanning the space between the two arms is the countershaft 3 carrying the spiral gear 5. The block 19 is of the form employed in the first class of projectors mentioned in which the shutter is located at the front of the projector housing. In this class of machines the bore 23 provides a bearing for the shutter shaft carrying a spiral gear meshing with the spiral gear of the countershaft, the countershaft and shutter shaft being thus unitarily mounted so as to preserve a correct mesh of the spiral gears connecting the two shafts. In the present invention however the bore 23 is utilized as a socket for a pin 24 which extends between the two arms of the block. This pin is slidably received within a lug 25 which forms a lateral extension of the bearing member 15 in the vicinity of the arm 16. The lug 25 is of a shape to form a snug fit between the arms of the block 19 altho free to rock a limited distance upon the pin 24.

The arms 16 and 17 of the bracket 14 have eyes 26 and 27 formed in their ends for receiving studs 10 and 11 respectively, and a nut 27 upon stud 10 and a nut 28 upon stud 11 are adapted to clamp the bracket 9 against flat seats formed on the wall 1. Similarly nuts 29 and 30 upon stud 10 and nuts 31 and 32 upon stud 11 serve to accurately locate and to positively retain the arms 16 and 17 of bracket 14 in position lengthwise of the studs. That is, by adjusting the two pair of nuts 29, 30 and 31, 32 along the studs the arms 16 and 17 may be moved inwardly or outwardly.

In drilling the eyes 26 and 27, particular care is exercised to insure that the eye 26 is located as accurately as possible with reference to the position occupied by the bore forming the bearing for the shutter shaft and the opening in which the pin 24 is received since it is the arm 16 alone which insures the proper interengagement of the spiral gears 8 and 5, the arm 17 merely acting as an auxiliary support for the bearing member 15. The eyes 26 and 27 must of necessity be made slightly oversize in order to provide sufficient clearance for the passage of the studs 10 and 11 therethru, and this clearance permits the bracket to be rocked an infinitesimal distance about the pin 24 to bring the spiral gears in correct registry when the nuts 29 and 30 upon stud 10 are finally adjusted, it being apparent from Fig. 2 that any rotation of the bearing member about the pin 24 will swing the spiral gear 8 in an arc toward and from the spiral gear 5. The maintenance of the correct assembly of the spiral gears is of the utmost importance for the reason that the two gears must not be positioned so closely together as to bind or lead to excessive wear, thus impairing the operation of the shutter, nor yet be located too far apart so as to result in appreciable play between the gears. Since the broached-hold gear 5 by means of suitable mechanism, not shown, is arranged to be moved longitudinally of the gear 8 for synchronizing the shutter with the film feeding mechanism, the two gears must be positioned a distance apart such as will not offer too great frictional resistance to the travel of gear 5 along gear 8.

It frequently happens that when the two spiral gears are in correct relative position the arms 16 and 17 do not lie in a plane exactly perpendicular to the axes of studs 10 and 11. Consequently when the nuts 29 and 30 are screwed up into contact with the arm 16 they do not seat flatly against its surfaces but approach the slanting surfaces of the arm so as to make only edge or point contact therewith. This results in a very insecure fastening. In order to positively maintain the arm 16 in its correctly adjusted position irrespective of whether or not it extends in a plane exactly perpendicular to the stud 10, bearing rings 34 and 34a are interposed between the clamping nuts 29 and 30 and the arm 16. These rings are each of circular shape having a central aperture therein of sufficient clearance to fit over the stud 10. One side of the ring is perfectly flat while its opposite side is convexly rounded conforming to the surface of a sphere. The convex, or crowned, surface of the ring 34 is designed to fit within a concave recess 35 formed in the arm 16 concentric with the eye 26 and of a curvature complementary to the convex surface of ring 34. Similarly the convex surface of ring 34a is adapted to seat in the concave recess 35a concentrically arranged with respect to the eye 26 upon the opposite side of the arm. As best shown in Fig. 5, the nuts 29 and 30 are designed to bear against the flat faces of the rings 34 and 34a respectively so that when the nuts are tightened the crowned faces of the rings will engage within the concave recesses 35 and 35a and provide a maximum bearing with their bottoms regardless of lack of conformity of arm 16 with a true vertical plane. That is, while the angularity of the arm 16 may vary thru considerable amplitude and the flat faces of the rings 34 and 34a must necessarily remain perpendicular to the axis of the stud 10, nevertheless there is always complete contact between the convex faces of the rings and their seats due to their spherical surfaces of contact. The arm 17, on the other hand, is held upon the stud 11 by the usual nuts 31 and 32 no special provision for maintaining this arm in exact predetermined location upon the stud being required since it performs no locating function for the bearing 15. On the contrary the nuts 31 and 32 should not be fastened too tightly since this has a tendency to spring the bearing 15 and bind the shaft 4 therein.

The form of bracket mounting just described affords expeditious means for assembling projectors having their shutter mounted intermediate the housing and the lamphouse and insures the positive retention of the shutter shaft in fixed position relative to the countershaft.

I claim:

1. In a motion picture projecting machine having a frame and a stud projecting laterally from said frame, a shutter shaft, a bearing member within which said shaft is journaled, said bearing member being provided with a bracket arranged to receive the stud, means associated with said stud for adjusting the bracket longitudinally of the stud, a support fixedly attached to the frame, means for pivotally mounting said bearing member in said support, a gear carried by said frame, and a gear carried by said bracket and movable toward or away from said first-mentioned gear as said bracket is adjusted.

2. In a motion picture projecting machine having a frame and a stud projecting laterally from said frame, a shutter shaft carrying a gear, a bearing member within which said shaft is journaled, said bearing member being provided with a bracket arranged to receive the stud, means associated with said stud for adjusting the bracket longitudinally of the stud, a support fixedly attached to the frame, a countershaft mounted in the support and also carrying a gear in mesh with the gear on the shutter shaft, and a pivot for the bearing in said support, the arrangement being such that adjustment of the bracket along the stud will vary the degree of contact between the gears.

3. In a motion picture projecting machine having a frame and a stud projecting laterally from said frame, a shutter shaft carrying a gear, a bearing member within which said shaft is journaled, said bearing member being provided with a bracket having an opening therein arranged to receive the stud, nuts threaded upon said stud and located upon opposite sides of the bracket for adjusting the bracket longitudinally of the stud, a support fixedly attached to the frame, a countershaft mounted in the support and also carrying a gear in mesh with the gear on the shutter shaft, a pivot for the bearing in said support so that adjustment of the bracket lengthwise of the stud will rock the bearing about the pivot, and bearing rings interposed between the nuts and the bracket each of said rings being provided with a convex spherical surface adapted to seat in a complementary concave recess formed in the bracket concentric with its opening, said ring also having a flat surface against which the nut is adapted to bear.

4. In a motion picture projecting machine having a frame and a pair of studs projecting from said frame, a shutter shaft carrying a gear, a bearing member within which said shaft is journaled, said bearing member being provided with a bracket having spaced apart openings therein arranged to receive the stud, nuts threaded upon said studs upon opposite sides of the bracket for adjusting the bracket longitudinally of the stud, a support fixedly attached to the frame, a countershaft mounted in the support and also carrying a gear in mesh with the gear on the shutter shaft, a pivot for the bearing in said support so that adjustment of the bracket lengthwise of the stud will rock the bearing about the pivot, and bearing rings interposed between the nuts on one of said studs and the bracket, each of said rings being provided with a spherical surface complementary with a spherical surface formed upon the bracket surrounding one of its openings and with a flat surface against which the nut is adapted to bear.

5. A combination of a frame, a pin, means for supporting said pin on said frame, a spiral gear, means for mounting said gear on said frame, a bracket, means comprising said pin for pivotally mounting said bracket on said frame, a second spiral gear, means for mounting said second gear on said bracket in engagement with said first gear and means mounted on said frame for pivotally adjusting said bracket whereby the separation of said gears may be varied.

MICHAEL BERKOWITZ.